US010158291B1

United States Patent
Cinagrossi et al.

(10) Patent No.: US 10,158,291 B1
(45) Date of Patent: Dec. 18, 2018

(54) DC/DC CONVERTER FOR HIGH VOLTAGE APPLICATIONS WITH INPUT VOLTAGE BOOST, INPUT CAPACITOR DISCHARGE AND OUTPUT CAPACITOR COMPENSATION MODES

(71) Applicant: PAI Capital LLC, Santa Clara, CA (US)

(72) Inventors: Nicola Cinagrossi, Uster (CH); Ivan Feno, Bertschikon (CH); Alain Chapuis, Riedikon (CH)

(73) Assignee: Bel Power Solutions Inc., Santa Clara, CA (US)

( * ) Notice: Subject to any disclaimer, the term of this patent is extended or adjusted under 35 U.S.C. 154(b) by 19 days.

(21) Appl. No.: 15/354,293

(22) Filed: Nov. 17, 2016

Related U.S. Application Data

(60) Provisional application No. 62/256,227, filed on Nov. 17, 2015.

(51) Int. Cl.
*H02M 3/158* (2006.01)
*H02M 1/08* (2006.01)
*H02M 1/00* (2006.01)

(52) U.S. Cl.
CPC .............. *H02M 3/158* (2013.01); *H02M 1/08* (2013.01); *H02M 2001/0009* (2013.01)

(58) Field of Classification Search
CPC .... H02M 3/33507; H02M 3/335; H02M 1/42; H02M 3/158; H02M 1/08; H02M 2001/0009
See application file for complete search history.

(56) References Cited

U.S. PATENT DOCUMENTS

| | | | |
|---|---|---|---|
| 7,977,816 B2* | 7/2011 | Wei | H02J 7/0065 307/31 |
| 9,729,055 B1* | 8/2017 | Yao | H02M 3/158 |
| 2017/0077818 A1* | 3/2017 | Werner | H02M 3/33507 |

OTHER PUBLICATIONS

"TPS61098x Ultra-Low Quiescent Current Synchronous Boost with Integrated LDO/Load Switch," SLVS873D, Texas Instruments, Jun. 2015.*

(Continued)

*Primary Examiner* — Jue Zhang
*Assistant Examiner* — Jye-June Lee
(74) *Attorney, Agent, or Firm* — Patterson Intellectual Property, P.C.; Gary L. Montle

(57) ABSTRACT

A DC/DC converter is provided for operation within a narrow voltage range during normal conditions, while allowing for a wider input voltage range for short periods of time. A first switch is coupled across first and second input terminals, and a capacitor is coupled in parallel with the first switch and across the input terminals. A second switch is coupled in series with the first input terminal and between the first switch and the capacitor. Operation of the switches is regulated in accordance with a bypass mode of operation when received input power is within a defined range, and a boost mode of operation when received input power is less than a threshold value, wherein the received input power is boosted to a bulk output power within the defined range. Boost operations may in various embodiments be provided via, for example, a critical conduction scheme or continuous conduction scheme.

20 Claims, 3 Drawing Sheets

(56) References Cited

OTHER PUBLICATIONS

Professional Education Seminar S17 "Practical Application of 600V GaN HEMTs in Power Electronics," Eric Persson, APEC 2015 presentation, Mar. 16, 2015.*
"CoolMOS™ 900V, New 900V class for superjunction devices," Application Note, Infineon, May 2008.*
"Design and Analysis of High Frequency Power Converters for Envelope Tracking Applications," Thesis, T. C. Smith, Rochester Institute of Technology, May 2015.*

* cited by examiner

DC/DC CONVERTER FOR HIGH VOLTAGE APPLICATIONS WITH INPUT VOLTAGE BOOST, INPUT CAPACITOR DISCHARGE AND OUTPUT CAPACITOR COMPENSATION MODES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 62/256,227, filed Nov. 17, 2015, and which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to DC-DC power converters. More particularly, this invention pertains to DC-DC converters optimized for high voltage applications.

Large data centers can host thousands of servers consuming significant energy. Conventionally, energy in such data centers has been distributed by single or three-phase AC voltages. To minimize the number of power conversion stages and to make it easier to attach more renewable energy sources to improve the overall energy efficiency of such data centers, power is distributed via a high voltage DC bus within the data center. Such high voltage is normally around 380 VDC. To further maintain the efficiency of power converters attached to this high voltage bus, it is necessary to limit the high voltage variations, e.g., to five percent.

In case of energy supply interruptions, it is common to have local diesel generators to provide the energy to the data center. However, such large scale diesel generators require up to several minutes to start and provide full power. This start-up transition time must be bridged by batteries or other short term energy supply components (e.g., capacitors or fly wheels). Depending on where and how such local short term energy sources are being attached, large voltage deviations on the high voltage DC bus may result.

It is therefore required to have a DC/DC converter which operates at very high efficiency when the high voltage DC bus is within a tight regulation band, but also can sustain large voltage variations during transition periods over several tens of seconds to a few minutes without losing regulation on its output. Such a converter will allow the back-up batteries to attach directly to the high voltage DC bus used to transition from normal grid operation to diesel generators.

FIG. 1 shows a typical DC/DC converter 100 with an input filter 101 (including in the illustrated example a capacitor C1, inductor L1, and capacitor C3) and a discharge resistor R1 to discharge the filter capacitors C1/C3 when the converter 100 is unplugged from an input power source Vi. The filter 101 is followed by a booster stage 102 (including in the illustrated example an inductor L2, switch S0, and diode D2) which is bypassed by diode D1 if the input voltage is higher than the maximum booster operating voltage. The booster stage 102 is followed by an energy storage and filter capacitor C2 and a DC/DC stage 103 providing galvanic isolation and a low voltage output.

The converter 100 of FIG. 1 suffers from several deficiencies: (a) the discharge resistor R1 creates permanent energy losses; (b) the booster stage has low efficiency because of the diode rectification; (c) when the booster stage is off, it is bypassed by diode D1, but this diode also generates significant losses; and (d) when the booster stage is off, several components are not in use (e.g., switch S0, diode D2, inductor L2) and poor power density of the overall converter will result.

BRIEF SUMMARY OF THE INVENTION

An isolated DC/DC converter may operate in a narrow (typically +/−5%) operating range during normal operation and with a much larger operating range (typically −50%/+5%) for short time periods (typically 1 . . . 2 min). As previously discussed, a single stage converter is generally unable to provide wide regulation without compromising efficiency requirements. To achieve best efficiency, a dual stage topology as disclosed herein is capable of providing both efficiency and wide regulation.

Various embodiments of a switching converter as disclosed herein are configured for coupling to an input voltage source, and include an isolated DC/DC stage and a synchronous booster stage coupled between the input voltage source and the isolated DC/DC stage. The booster stage is configured to operate in a bypass mode when a detected converter input voltage is within a defined input voltage range, and to operate in a boost mode if the converter input voltage is less than a specified threshold, to thereby extend the input voltage range of the DC/DC stage.

In an exemplary embodiment, a switching converter as disclosed herein includes first and second input terminals for receiving input power from an input power source, and a first switching element coupled across the first and second input terminals. A capacitor is coupled in parallel with the first switching element and across the first and second input terminals. A second switching element is coupled in series with the first input terminal and between the first switching element and the capacitor. Control circuitry is configured to generate control signals and thereby regulate operation of the first and second switching elements in accordance with: a bypass mode of operation when the received input voltage is within a defined range; and in a boost mode of operation when the received input voltage is less than a threshold associated with the defined range, wherein the received input voltage is boosted to a bulk output voltage within the defined range.

In one aspect of such an embodiment, the control circuitry may be configured to generate the control signals continuously during the boost mode of operation, while the received input voltage is less than the threshold associated with the defined range.

In another aspect of such an embodiment, the control circuitry may be configured to generate the control signals for a defined period of time during the boost mode of operation, upon determining the received input voltage is less than the threshold associated with the defined range.

In another aspect of such an embodiment, the first and second switching elements may be GaN field-effect transistors, and the control circuitry may be configured during the boost mode to generate substantially complementary PWM control signals to the first and second switching elements in a continuous conduction operation.

In another aspect of such an embodiment, an inductive element may be coupled on a first end to the first input terminal and on a second end to a node between the first and second switching elements, wherein the inductive element in conjunction with at least the capacitor acts as a differential mode filter during the bypass mode of operation.

The control circuitry may be configured during the boost mode to turn the second switching element OFF when a detected current through the inductive element reaches zero, and to turn the first switching element ON when a detected voltage at the node between the first and second switching elements reaches zero. In an embodiment, this critical conduction mode may be implemented wherein the first and second switching elements may be GaN field-effect transistors. Alternatively, the critical conduction mode may also be implemented wherein the first and second switching elements are superjunction field-effect transistors, or wherein the first switching element is a GaN field-effect transistor and the second switching element is a superjunction field-effect transistor.

The control circuitry may further be adapted such that upon detecting a disconnection of the input power source from the first and second input terminals it will maintain the first switching element in an ON position and the second switching element in an OFF position for a defined period of time.

In still another aspect of the aforementioned embodiment, the control circuitry may further be configured upon detecting disconnection of the input power source from the first and second input terminals to pulse the first switching element ON and OFF for a defined period of time, while maintaining the second switching element in an OFF position.

In still another aspect of the aforementioned embodiment, the control circuitry may further be configured in association with detected load changes, and during the bypass mode, to generate the control signals in a series of complementary pulses to the first and second switching elements to recharge the capacitor.

DETAILED DESCRIPTION OF THE INVENTION

Figure 1:
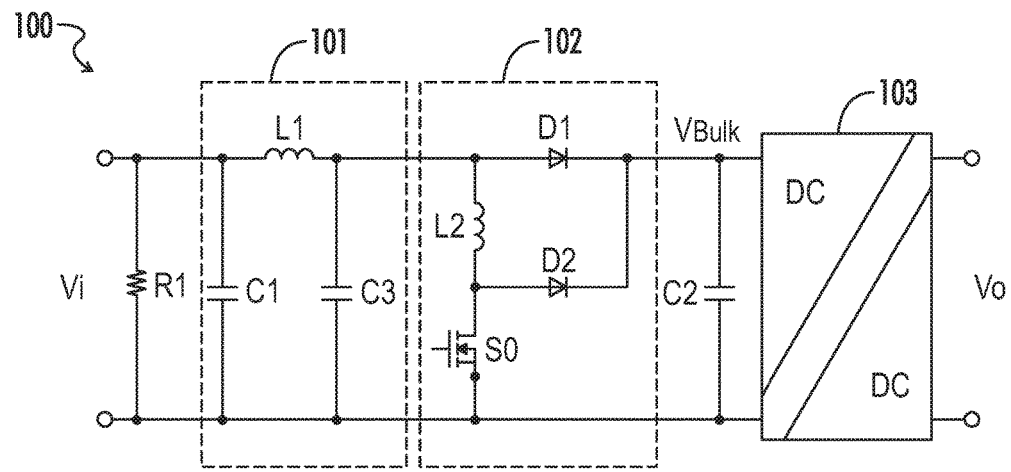
FIG. 1 is a schematic circuit diagram of a conventional DC-DC converter having a filter and booster stage followed by a DC/DC stage.

Referring generally to FIGS. 2-5, various exemplary embodiments of an invention may now be described in detail. Where the various figures may describe embodiments sharing various common elements and features with other embodiments, similar elements and features are given the same reference numerals and redundant description thereof may be omitted below.

Figure 2:
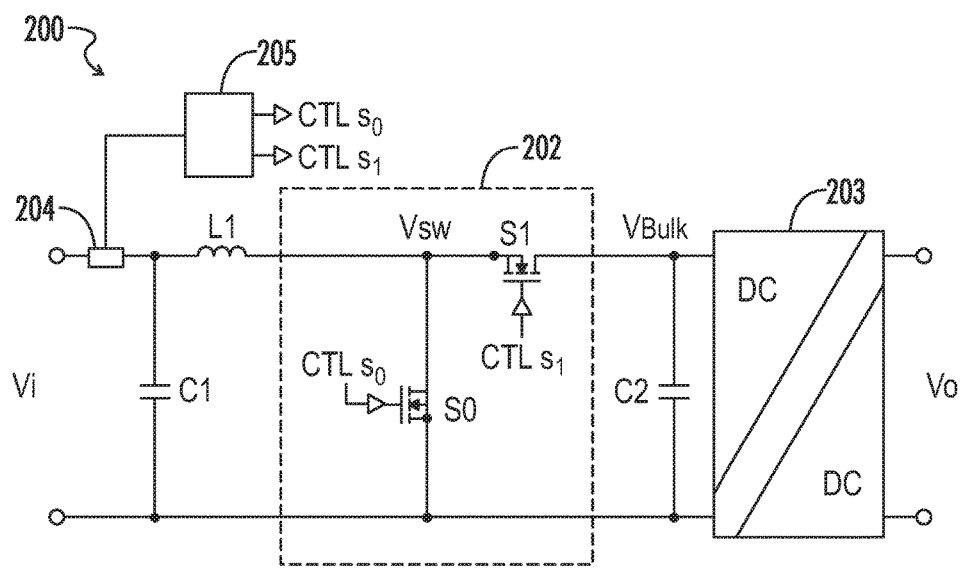
FIG. 2 is a schematic circuit diagram of an embodiment of a switching converter as disclosed herein, including a synchronized booster stage.

Referring initially to FIG. 2, a switching converter 200 as disclosed herein includes an input power source Vi, and a synchronous boost converter 202 (a booster stage with an active rectification switch S1) in front of an isolated DC/DC converter 203. A controller 205 is configured to generate control signals CTL_S0 and CTL_S1 for driving respective first and second switching elements S0 and S1 in the booster stage 202. During normal operation when the input voltage Vi is within a narrow input voltage range, the booster stage 202 may be bypassed by turning off first switching element S0 and turning on second switching element S1 continuously (i.e., a bypass mode of operation). The DC/DC stage 203 may be designed so as to optimize efficiency within the narrow input voltage range. The boost inductor L1 operates as differential mode filter in conjunction with capacitors C1 and C2.

A sensor 204 such as, for example, a resistor or the like may be coupled to one or more input terminals, wherein the input voltage Vi may be sensed and fed back to the controller 205. If the input voltage Vi is detected as falling below a specific threshold, the switching elements S0 and S1 may be controlled by a substantially complementary pulse width modulated (PWM) signal generated from the controller 205, which allows for the conversion of the low input voltage Vi to a VBulk voltage within the narrow input voltage range of the DC/DC converter (i.e., a boost mode of operation).

Figure 3:
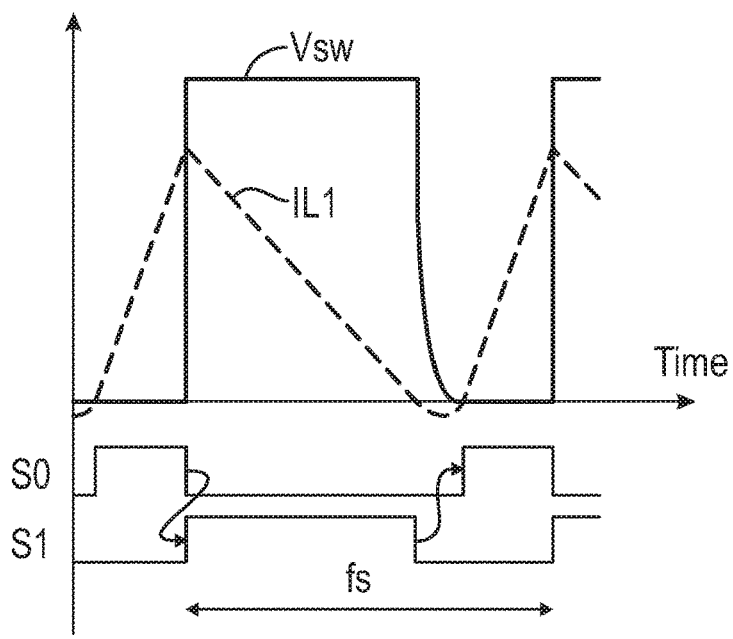
FIG. 3 is a graphical representation of exemplary switching waveforms obtained from the converter of FIG. 2, using superjunction FETs as the switching devices.
Figure 4:
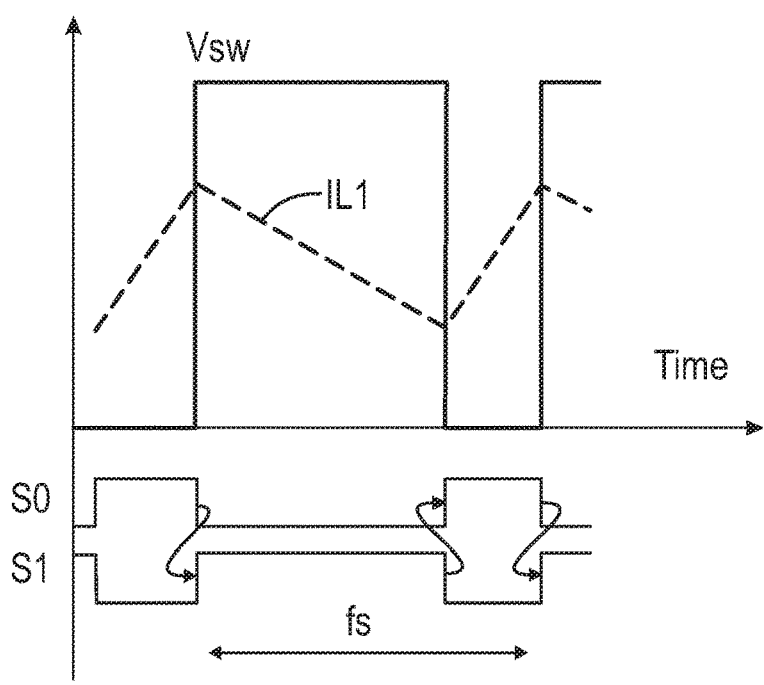
FIG. 4 is a graphical representation of exemplary switching waveforms obtained from the converter of FIG. 2, using GaN transistors as the switching devices.

Because the booster stage 202 is operated only for a relatively short time, the design of the booster stage can be optimized for size and cost. To reduce size of the booster stage, it may preferably be operated at a high switching frequency. However, higher switching frequencies frequently result in higher switching losses, especially when operating voltages are high. If superjunction MOSFETs are used for switching elements S0 and S1, then a critical conduction mode control scheme as shown in FIG. 3 may be preferred. In this mode, a slight negative current of the inductor current at the end of the conduction cycle of switching element S1 will discharge the parasitic switching capacitances on the switching node voltage (Vsw) at or close to 0V, allowing the switching element S1 to switch off at zero current, and thus avoiding reverse recovery losses of its body-drain diode. Also, switching element S0 can be turned on at zero voltage, thus avoiding switching losses. Such a critical conduction control scheme may typically result in a variable switching frequency, as a function of the input-to-output voltage ratio and also of the load.

To reduce the size of the device further, gallium nitride (GaN) based transistors can be used for the switching elements S0, S1. Because of their intrinsic, very small parasitic capacitances and the absence of a lossy source to drain body diode, GaN devices are well suited for high switching frequency operation, even when having to switch off under load. This favors a classical continuous conduction mode operation with a substantially constant switching frequency, as illustrated for example in FIG. 4. The switching elements S0, S1 are operated with substantially complementary pulse width modulated signals, with small delays between the transitions to avoid cross conduction.

In some embodiments, the critical conduction control scheme of FIG. 3 can also be used with GaN devices. Because the parasitic capacitances of such switching elements are very low, the transition time when switching element S1 switches off will be very short, and less reverse current is used in general. Such a configuration would favor extra high efficiency operation in conjunction with a small boost inductor, and hence result in a very small overall size.

In either aforementioned configuration, e.g., using either superjunction FETs or GaN based transistors, the switching elements S0 and S1 can further be used to discharge the input capacitor C1 when the power conversion module is unplugged or disconnected from the input power supply. In such cases, the charge stored in capacitor C1 can present a safety hazard to an operator or user, such that it is necessary to discharge the capacitor C1 to reduce the voltage to a safe level quickly. A resistor R1 may be provided in parallel with the capacitor C1 to discharge the capacitor. However, such a resistor also dissipates power in normal operation, affecting the overall efficiency of the module. In an embodiment of the switching converter 200 as illustrated in FIG. 2, no discharge resistor is used. Instead, the aforementioned discharge process may be accomplished by keeping switching element S0 on for a defined period of time, or by pulsing switch S0 on/off after the module is unplugged. Detection of a disconnected or unplugged status can be implemented, for example, by a pin on the input power connector which connects last/disconnects first.

Because the capacitance of capacitor C2 is generally quite small (e.g., 1 uF per 100 W of output power), this capacitor will charge up/down quite significantly during load changes. Even if the input voltage is within the defined narrow input voltage range, and therefore the booster circuit 202 is idling (i.e., in the bypass mode of operation), it might be beneficial to turn on the booster circuit 202 for a short time to quickly recharge the capacitor C2. Turning on switching element S0 for a short period of time will increase the inductor current I_L1 much faster than would otherwise be the case, because now the voltage across the inductor is the total input voltage and not simply the difference between the input voltage and the voltage across the capacitor C2. When switching element S0 is in conduction mode, the capacitor C2 does not receive any charge from the input and therefore will discharge even faster, but once switching element S0 is opened and switching element S1 is closed, the higher energy stored in inductor L1 will then transfer into the capacitor C2 and recharge it much faster. Several such pulses can be triggered by the (non-linear) controller to keep the capacitor C2 well-charged (i.e., a compensation mode of operation).

According to certain embodiments of the invention, the booster circuit 202 can therefore have at least four operating modes or functions: (1) a bypass mode of operation, wherein switching element S0 is open and switching element S1 is closed; (2) a boost mode of operation, wherein switching elements S0 and S1 are switching with substantially complementary drive signals; (3) a discharge mode of operation, wherein switching element S0 is closed or pulsing and switching element S1 is kept open; and (4) a compensation mode of operation, wherein switching elements S0 and S1 are operated in a complementary burst mode.

Figure 5:
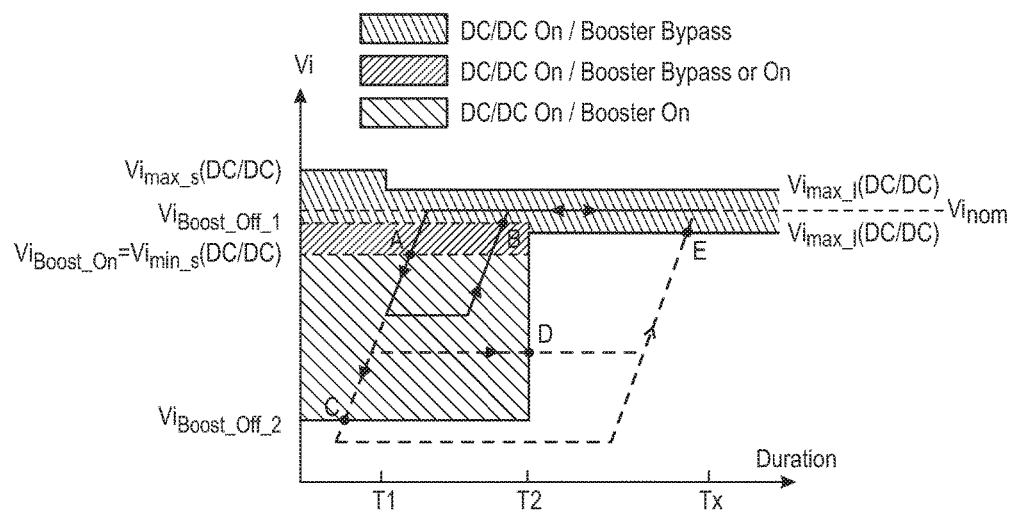
FIG. 5 is a voltage/time diagram representing an exemplary operation of the converter of FIG. 2.

An exemplary embodiment of a switching converter as disclosed herein can be further characterized by the voltage/time diagram as represented in FIG. 5. The DC/DC converter 203 can operate within a narrow input voltage range $\{Vi_{min\_1}(DC/DC) \ldots Vi_{max\_1}(DC/DC)\}$ for a substantially infinite time. It further can operate for a short duration delimited by time T1 and time T2 within a wider input voltage range $\{Vi_{min\_s}(DC/DC) \ldots Vi_{max\_s}(DC/DC)\}$. The booster stage 202 may operate in the boost mode for up to time T2, and if the input voltage Vi is within input voltage range $\{Vi_{Boost\_On} \ldots Vi_{Boost\_Off\_2}\}$ whereas $Vi_{Boost\_On}$ is substantially equal to $V_{min\_s}$ (DC/DC).

If the input voltage falls to $Vi_{Boost\_On}$ (Point A), the booster stage may be configured to change its operating mode from bypass to boost. If the input voltage recovers within time T2, then the booster stage may be transitioned back to the bypass mode of operation at $Vi_{Boost\_Off\_1}$ (Point B). If the input voltage remains above $Vi_{Boost\_Off\_2}$, but exceeds the maximum allowed operating time T2 of the booster stage in boost mode, then the overall converter 200 switches off (Point D). If, however, the input voltage continues to fall within time T2, the overall converter 200 will switch off when the input voltage Vi falls below $Vi_{Boost\_Off\_2}$ (Point C). In both such cases, the converter 200 may be configured to only turn on again when the input voltage has recovered to at least $Vi_{min\_1}$ (DC/DC) (Point E).

Table 1 provides exemplary values for each parameter defined in FIG. 5. These values are not intended as limiting the scope of an invention as disclosed herein, unless otherwise expressly stated.

| Parameter | Value |
|---|---|
| $Vi_{nom}$ | 380 Vdc |
| $Vi_{max\_s}$(DC/DC) | 420 Vdc |
| $Vi_{min\_s}$(DC/DC) | 355 Vdc |
| $Vi_{max\_1}$(DC/DC) | 400 Vdc |
| $Vi_{min\_1}$(DC/DC) | 360 Vdc |
| $Vi_{Boost\_Off\_1}$ | 365 Vdc |
| $Vi_{Boost\_Off\_2}$ | 250 Vdc |
| $Vi_{Boost\_On}$ | 355 Vdc |
| T1 | 1 sec |
| T2 | 90 sec |

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "switching element," "switching device" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A switching converter comprising:
   first and second input terminals for receiving input voltage from an input voltage source;
   first and second capacitors coupled across the first and second input terminals;
   a first switching element coupled across the first and second input terminals, between the first and second capacitors;
   a second switching element coupled in series with the first input terminal and between the first switching element and the second capacitor; and
   control circuitry configured to generate control signals to regulate operation of the first and second switching elements in accordance with
      a bypass mode of operation when the received input voltage is within a defined range, and
      a boost mode of operation when the received input voltage is less than a threshold associated with the defined range, wherein the received input voltage is boosted to a bulk output voltage within the defined range,
   wherein the control circuitry is further configured upon detecting disconnection of the input power source from the first and second input terminals to maintain the second switching element in an OFF position for a defined period of time, and to maintain the first switching element in an ON position or pulse the first switching element ON and OFF for the defined period of time, wherein the first capacitor is discharged.

2. The switching converter of claim 1, wherein the control circuitry is configured to generate the control signals continuously during the boost mode of operation, while the received input voltage is less than the threshold associated with the defined range.

3. The switching converter of claim 1, wherein the control circuitry is configured to generate the control signals for a defined period of time during the boost mode of operation, upon determining the received input voltage is less than the threshold associated with the defined range.

4. The switching converter of claim 1, wherein the first and second switching elements are GaN field-effect transistors, and the control circuitry is configured during the boost mode to generate substantially complementary PWM control signals to the first and second switching elements in a continuous conduction operation.

5. The switching converter of claim 1, further comprising an inductive element coupled on a first end to the first input terminal and on a second end to a node between the first and second switching elements, wherein the inductive element in conjunction with the first and second capacitors acts as a differential mode filter during the bypass mode of operation.

6. The switching converter of claim 5, wherein the first and second switching elements are GaN field-effect transistors, and the control circuitry is configured during the boost mode to turn the second switching element OFF when a detected current through the inductive element reaches zero, and to turn the first switching element ON when a detected voltage at the node between the first and second switching elements reaches zero.

7. The switching converter of claim 5, wherein the first and second switching elements are superjunction field-effect transistors, and the control circuitry is configured during the boost mode to turn the second switching element OFF when a detected current through the inductive element reaches zero, and to turn the first switching element ON when a detected voltage at the node between the first and second switching elements reaches zero.

8. The switching converter of claim 5, wherein the first switching element is a GaN field-effect transistor and the second switching element is a superjunction field-effect transistor, and the control circuitry is configured during the boost mode to turn the second switching element OFF when a detected current through the inductive element reaches zero, and to turn the first switching element ON when a detected voltage at the node between the first and second switching elements reaches zero.

9. The switching converter of claim 1, wherein the control circuitry is further configured in association with detected load changes, and during the bypass mode, to generate the control signals in a series of complementary pulses to the first and second switching elements to recharge the second capacitor.

10. A method of operating a synchronous boost stage for a switching converter having first and second input terminals and first and second output terminals, wherein a first capacitor, a first switching element and a second capacitor are coupled in parallel across the respective pairs of input and output terminals, and wherein a second switching element is coupled in series with the first input terminal and the first output terminal between the first switching element and the second capacitor, the method comprising:
   during a bypass mode of operation wherein a detected input voltage across the input terminals is within a defined voltage range, controlling the first switching element to be OFF and the second switching element to be ON;
   upon detecting the input voltage to be less than a threshold associated with the defined voltage range, controlling the first and second switching elements ON and OFF to boost the input voltage to an output voltage across the first and second output terminals to be within the defined voltage range; and
   upon detecting disconnection of the input power source from the first and second input terminals, maintaining the second switching element in an OFF position for a defined period of time, and maintaining the first switching element in an ON position or pulsing the first switching element ON and OFF for the defined period of time, wherein the first capacitor is discharged.

11. The method of claim 10, wherein controlling the first and second switching elements ON and OFF to boost the input voltage comprises controlling the first and second switching elements continuously while the detected input voltage is less than the threshold associated with the defined voltage range.

12. The method of claim 10, wherein controlling the first and second switching elements ON and OFF to boost the input voltage comprises controlling the first and second switching elements for a defined period of time.

13. The method of claim 10, wherein an inductive element is coupled between the first input terminal and the first switching element, and wherein controlling the first and second switching elements ON and OFF to boost the input voltage comprises
turning the second switching element OFF when a detected current through the inductive element reaches zero, and
turning the first switching element ON when a detected voltage at a node between the first and second switching elements reaches zero.

14. The method of claim 10, further comprising:
detecting a change in load during the bypass mode; and
responsive to the load change, complementary pulsing of the first and second switching elements ON and OFF to recharge the second capacitor.

15. A switching converter comprising:
first and second input terminals for receiving input voltage from an input voltage source;
first and second capacitors coupled across the first and second input terminals;
a first switching element coupled across the first and second input terminals, between the first and second capacitors;
a second switching element coupled in series with the first input terminal and between the first switching element and the second capacitor; and
control circuitry configured to generate control signals to regulate operation of the first and second switching elements in accordance with
a bypass mode of operation when the received input voltage is within a defined range, and
a boost mode of operation when the received input voltage is less than a threshold associated with the defined range, wherein the received input voltage is boosted to a bulk output voltage within the defined range,
wherein the control circuitry is further configured responsive to detected load changes during the bypass mode to cause the first and second switching elements to operate in a complementary burst mode comprising one or more pulses wherein the second capacitor is recharged.

16. The switching converter of claim 15, wherein the first and second switching elements are GaN field-effect transistors, and the control circuitry is configured during the boost mode to generate substantially complementary PWM control signals to the first and second switching elements in a continuous conduction operation.

17. The switching converter of claim 15, further comprising an inductive element coupled on a first end to the first input terminal and on a second end to a node between the first and second switching elements, wherein the inductive element in conjunction with the first and second capacitors acts as a differential mode filter during the bypass mode of operation.

18. The switching converter of claim 17, wherein the first and second switching elements are GaN field-effect transistors, and the control circuitry is configured during the boost mode to turn the second switching element OFF when a detected current through the inductive element reaches zero, and to turn the first switching element ON when a detected voltage at the node between the first and second switching elements reaches zero.

19. The switching converter of claim 17, wherein the first and second switching elements are superjunction field-effect transistors, and the control circuitry is configured during the boost mode to turn the second switching element OFF when a detected current through the inductive element reaches zero, and to turn the first switching element ON when a detected voltage at the node between the first and second switching elements reaches zero.

20. The switching converter of claim 17, wherein the first switching element is a GaN field-effect transistor and the second switching element is a superjunction field-effect transistor, and the control circuitry is configured during the boost mode to turn the second switching element OFF when a detected current through the inductive element reaches zero, and to turn the first switching element ON when a detected voltage at the node between the first and second switching elements reaches zero.

* * * * *